United States Patent
Bailey (10) Patent No.: US 11,060,551 B1
(45) Date of Patent: Jul. 13, 2021

(54) SNAP ALIGNMENT GUARD FOR NUT PLATE RING

(71) Applicant: Lockheed Martin Corporation, Bethesda, MD (US)

(72) Inventor: Aaron J. Bailey, Bedford, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 499 days.

(21) Appl. No.: 15/799,363

(22) Filed: Oct. 31, 2017

(51) Int. Cl.
*F16B 27/00* (2006.01)
*F16B 39/282* (2006.01)

(52) U.S. Cl.
CPC .................................. *F16B 39/282* (2013.01)

(58) Field of Classification Search
CPC . F16B 2200/506; F16B 41/002; F01D 25/243
USPC ............ 411/84, 966, 968–970; 415/126–128
See application file for complete search history.

(56) References Cited

U.S. PATENT DOCUMENTS

| | | | | |
|---|---|---|---|---|
| 2,542,375 | A * | 2/1951 | Torresen | F16B 37/044 411/84 |
| 7,303,377 | B2 * | 12/2007 | Rockarts | F01D 5/027 416/144 |
| 8,246,299 | B2 * | 8/2012 | Razzell | F01D 11/005 415/173.1 |
| 8,875,377 | B2 | 11/2014 | Sleath et al. | |
| 9,083,169 | B2 * | 7/2015 | James | F16B 37/043 |
| 9,140,125 | B2 * | 9/2015 | Ivakitch | F01D 5/025 |
| 9,512,725 | B2 * | 12/2016 | Light | F01D 5/02 |
| 9,784,215 | B2 * | 10/2017 | Lu | F02K 1/80 |
| 10,047,624 | B2 * | 8/2018 | O'Leary | F01D 25/12 |
| 10,378,387 | B2 * | 8/2019 | Baldiga | F01D 25/28 |
| 10,458,268 | B2 * | 10/2019 | O'Leary | F01D 11/08 |
| 2006/0053758 | A1 * | 3/2006 | Wu | B01D 45/16 55/471 |
| 2009/0129889 | A1 | 5/2009 | Woodall et al. | |
| 2011/0103918 | A1 | 5/2011 | Woodall et al. | |
| 2012/0171023 | A1 * | 7/2012 | Albers | F01D 25/246 415/173.1 |
| 2012/0219412 | A1 * | 8/2012 | Nakayama | F01D 25/246 415/209.3 |
| 2014/0259625 | A1 | 9/2014 | Dumas et al. | |
| 2014/0283363 | A1 | 9/2014 | Wilkerson et al. | |
| 2015/0171023 | A1 * | 6/2015 | Andry | H01L 24/11 438/125 |
| 2015/0267555 | A1 * | 9/2015 | Plante | B64D 29/06 415/119 |
| 2015/0322890 | A1 * | 11/2015 | Lu | F02K 1/80 60/770 |
| 2016/0169265 | A1 | 6/2016 | Edwards | |

(Continued)

Primary Examiner — Gary W Estremsky
(74) Attorney, Agent, or Firm — Withrow & Terranova, PLLC (57) ABSTRACT

Disclosed herein is a snap alignment guard for a nut plate ring. The alignment guard includes a curved elongated body comprising an inner surface and an outer surface. The alignment guard further includes a plurality of couplings extending from the inner surface. Each of the plurality of couplings are configured to engage a nut plate ring to attach the alignment guard to the nut plate ring. The elongated body forms a plurality of apertures defined in the outer surface. Each of the plurality of apertures are configured to receive at least a portion of a nut plate to maintain a circumferential position of the nut plate relative to an inner surface of the nut plate ring.

20 Claims, 9 Drawing Sheets

(56) References Cited

U.S. PATENT DOCUMENTS

| | | | |
|---|---|---|---|
| 2017/0108009 A1* | 4/2017 | Obereich | F01D 5/027 |
| 2018/0209302 A1* | 7/2018 | Gendraud | F16B 39/108 |
| 2018/0291768 A1* | 10/2018 | Boeck | F01D 9/065 |
| 2019/0072001 A1* | 3/2019 | Weisbrod | F01D 25/243 |

* cited by examiner

SNAP ALIGNMENT GUARD FOR NUT PLATE RING

TECHNICAL FIELD

The embodiments relate generally to nut plate rings and, in particular, to a snap alignment guard for a nut plate ring to quickly and effectively attach nut plates to the nut plate ring.

BACKGROUND

Nut plate ring assemblies may be used in a variety of applications, such as in missile casing assemblies. Some nut plate ring assemblies include a metal ring with a plurality of floating nut plates attached to an interior surface of the ring. Each floating nut plate includes a panel and a nut plate attached to the panel such that the nut plate can move (or float) relative to the panel. This limited relevant movement accounts for tolerance variations and any similar misalignment. This is particularly important when nut plate ring assemblies include a large number of floating nut plates. Accordingly, each floating nut plate is attached to the ring by using two rivets to fixedly attach the panel of the floating nut plate to an interior surface of the metal ring.

The more floating nut plates that need to be attached, the more time, labor, and cost is required to form the nut plate ring assembly. Some nut plate ring assemblies require 68 floating nut plates, which thereby requires drilling 136 countersink holes and installation of 136 rivets. Further, if the threads of a floating nut plate are defective, the rivets must be drilled out in order to replace the floating nut plate. Gang channels and similar designs may reduce the riveting process, but the nut plates are generally not replaceable as the gang channels are usually made from sheet metal bent around the nut plates. Additionally, some nut plate ring assemblies include a protective plastic cover adhered (e.g., glued) to an interior surface of the ring to cover the floating nut plates. Thus, application of the protective cover may take a couple hours for the adhesive to bond and must be removed in order to replace the nut plate. Accordingly, current manufacturing and assembly of nut plate ring assemblies and other similar components is time intensive, labor intensive, and costly.

SUMMARY

A snap alignment guard for a nut plate ring is disclosed herein. The alignment guard includes a plurality of couplings extending from an outer surface and a plurality of apertures defined in the outer surface. The couplings are configured to engage a nut plate ring to attach the alignment guard to the nut plate ring and secure a plurality of nut plates between the alignment guard and the nut plate ring. Each of the apertures is configured to receive at least a portion of a nut plate to maintain a circumferential position of the nut plate relative to an inner surface of the nut plate ring. Each of the apertures is also configured to allow the nut plate to move within a predetermined range relative to the inner surface of the nut plate ring. In this way, the snap alignment guard facilitates fast, easy, and effective securement of nut plates to the nut plate ring (without rivets or adhesives) that are easily replaceable, while also providing some limited relative motion of the nut plates to account for tolerance variations and facilitate assembly of the nut plate ring to another article, such as a missile casing.

In one embodiment, an alignment guard is provided. The alignment guard includes a curved elongated body comprising an inner surface and an outer surface. The alignment guard further includes a plurality of couplings extending from the outer surface. Each of the plurality of couplings are configured to engage a nut plate ring to attach the alignment guard to the nut plate ring. The elongated body forms a plurality of apertures defined in the outer surface. Each of the plurality of apertures are configured to receive at least a portion of a nut plate to maintain a circumferential position of the nut plate relative to an inner surface of the nut plate ring.

In another embodiment, a nut plate ring assembly is provided. The nut plate ring assembly includes a nut plate ring, a first plurality of nut plates, and at least one alignment guard. The nut plate ring forms a first plurality of through openings circumferentially positioned about the nut plate ring. The first plurality of nut plates are configured to be positioned proximate an inner surface of the nut plate ring. Each of the plurality of nut plates at least partially aligned with one of the plurality of through openings. The at least one alignment guard is configured to be attached to the nut plate ring to secure at least a portion of the first plurality of nut plates between the nut plate ring and the at least one alignment guard. The at least one alignment guard includes a curved elongated body, a plurality of couplings, and a plurality of apertures. The curved elongated body includes an inner surface and an outer surface opposite the first surface. The plurality of couplings integrally extend from the outer surface. Each of the plurality of couplings are configured to engage a nut plate ring to attach the at least one alignment guard to the nut plate ring. The plurality of apertures are defined in the outer surface. Each of the plurality of apertures are configured to receive at least a portion of a nut plate of the first plurality of nut plates to maintain a general circumferential position of the nut plate relative to a through opening of the first plurality of through openings.

In another embodiment, a missile casing assembly is provided. The missile casing assembly includes a first cylinder, a second cylinder, a nut plate ring assembly, and a plurality of fasteners. The first cylinder includes a first plurality of through holes circumferentially positioned around the first cylinder. The second cylinder includes a second plurality of through holes circumferentially positioned around the second cylinder. The second cylinder is at least partially inserted within an interior of the first cylinder. The nut plate ring assembly is positioned within the second cylinder. The nut plate ring assembly includes a nut plate ring, a first plurality of nut plates, and at least one alignment guard. The nut plate ring includes a first plurality of through openings circumferentially positioned around the nut plate ring. The first plurality of nut plates are positioned proximate an inner surface of the nut plate ring. Each of the first plurality of nut plates is at least partially aligned with one of the first plurality of through openings. The at least one alignment guard is attached to the nut plate ring to secure at least a portion of the first plurality of nut plates between the nut plate ring and the at least one alignment guard. The at least one alignment guard includes a curved elongated body, a plurality of couplings, and a plurality of apertures. The curved elongated body includes a first surface and an inner surface opposite the first surface. The plurality of couplings are integrally extending from the inner surface. Each of the plurality of couplings are configured to engage a nut plate ring to attach the at least one alignment guard to the nut plate ring. The plurality of apertures are defined in the outer surface. Each of the plurality of apertures are configured to receive at least a portion of a nut plate of the first plurality of nut plates to maintain a general circumferential position of the nut plate relative to a through hole of the first plurality of through openings. Each of the plurality of fasteners are inserted through one of the first plurality of through holes of the first cylinder, the second plurality of through holes of the second cylinder, and the first plurality of through openings of the nut plate ring. Each of the plurality of fasteners engages one of the first plurality of nut plates to secure the first cylinder to the second cylinder.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first end" and "second end," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

A snap alignment guard for a nut plate ring is disclosed herein. The alignment guard includes a plurality of couplings extending from an outer surface and a plurality of apertures defined in the outer surface. The couplings are configured to engage a nut plate ring to attach the alignment guard to the nut plate ring and secure a plurality of nut plates between the alignment guard and the nut plate ring. Each of the apertures is configured to receive at least a portion of a nut plate to maintain a circumferential position of the nut plate relative to an inner surface of the nut plate ring. Each of the apertures is also configured to allow the nut plate to move within a predetermined range relative to the inner surface of the nut plate ring. In this way, the snap alignment guard facilitates fast, easy, and effective securement of nut plates to the nut plate ring (without rivets or adhesives) that are easily replaceable, while also providing some limited relative motion of the nut plates to account for tolerance variations and facilitate assembly of the nut plate ring to another article, such as a missile casing.

Figure 1A:
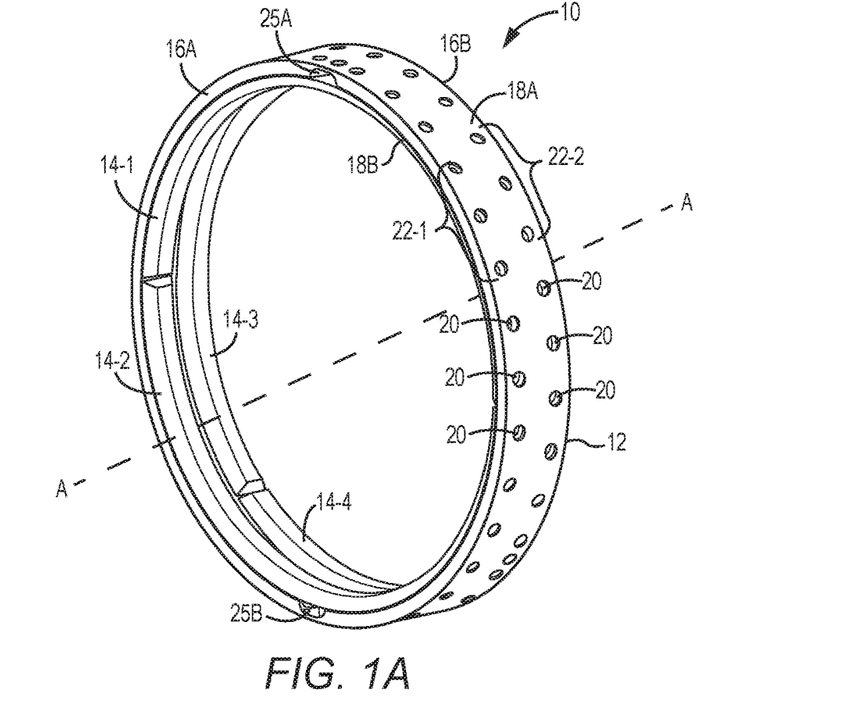
FIG. 1A is a perspective view of a first embodiment of a nut plate ring assembly with two rows of through holes and corresponding nut plates.
Figure 1B:
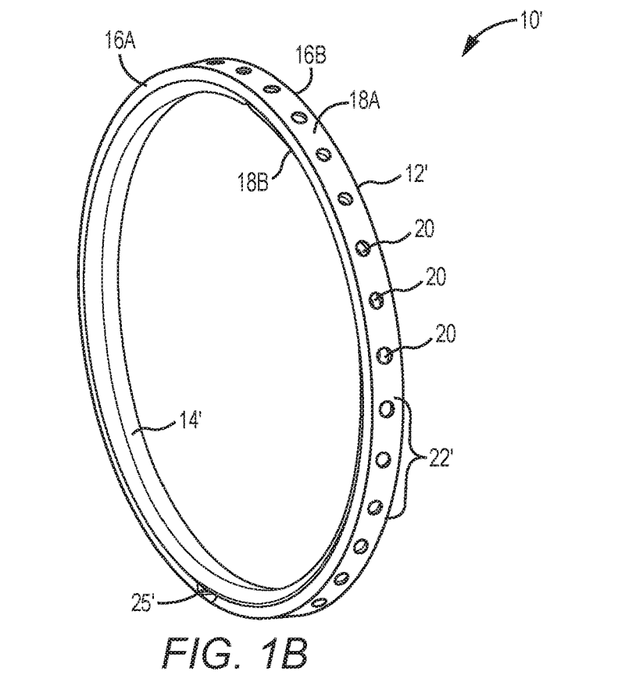
FIG. 1B is a perspective view of a second embodiment of a nut plate ring assembly with one row of through holes and corresponding nut plates.
Figure 1C:
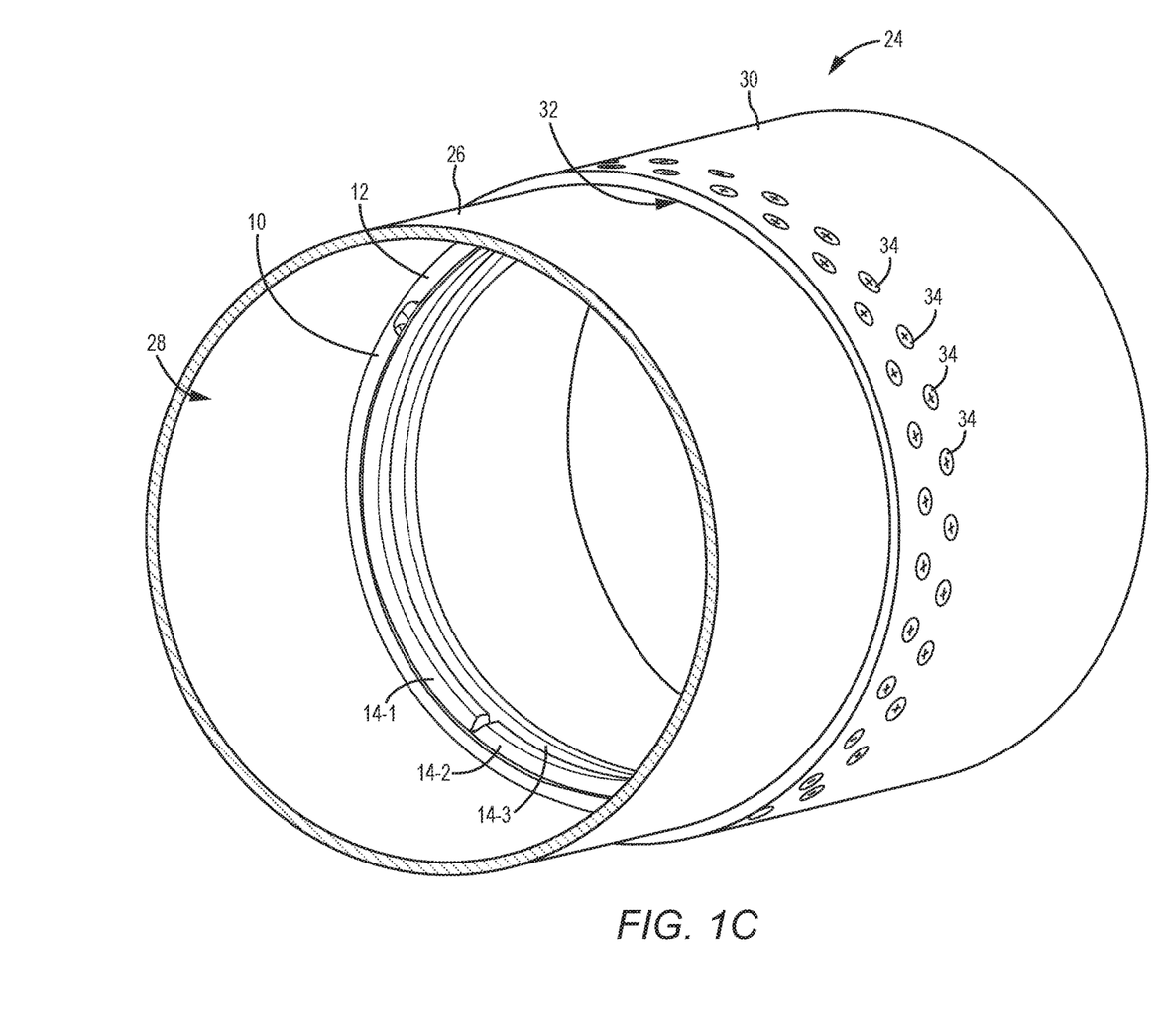
FIG. 1C is a perspective view of a missile casing assembly including the nut plate ring assembly of FIG. 1A.

FIGS. 1A-1C are views of embodiments of a nut plate ring assembly and attachment of the nut plate ring assembly in a missile casing assembly. FIG. 1A is a perspective view of a first embodiment of a nut plate ring assembly 10 with two rows of through holes and corresponding nut plates. The nut plates secured within the nut plate ring assembly 10 provide a floating threadable attachment point to absorb tolerance variations and secure at least one component to the nut plate ring assembly 10, such as to secure two cylinders together.

In particular, the nut plate ring assembly 10 includes a nut plate ring 12, alignment guards 14-1-14-4 (referred to generally as alignment guard 14) and a plurality of nut plates (not shown). The nut plate ring 12 has a generally cylindrical shape, although other shapes could be used. The nut plate ring 12 includes a first end 16A, a second end 16B (opposite the first end 16A), an outer surface 18A extending between the first end 16A and second end 16B, and an inner surface 18B (opposite the outer surface 18A) extending between the first end 16A and second end 16B. The nut plate ring 12 further includes a plurality of through openings 20 extending through a thickness of the nut plate ring 12 (discussed in more detail below). In other words the through openings 20 (also referred to as holes, apertures, etc.) extend from the outer surface 18A (also referred to as an exterior surface, external surface, distal surface, etc.) to the inner surface 18B (also referred to as an interior surface, medial surface, etc.). In particular, the through openings 20 include a first row 22-1 of through openings 20 circumferentially extending around the nut plate ring 12 and a second row 22-2 of through openings 20 circumferentially extending around the nut plate ring 12. The first row 22-1 is axially offset from the second row 22-2 (generally referred to as rows 22) along axis A-A. Further, the first row 22-1 is circumferentially offset from the second row 22-2, such that the through openings 20 of the first row 22-1 and second row 22-2 are staggered relative to one another. Of course, other configurations may be used. For example, the first row 22-1 and second row 22-2 of through openings 20 could be circumferentially aligned; there could be more or fewer rows of through openings 20, etc. It is noted that unlike some other designs, the alignment guard 14 and nut plate ring 12 design of the present disclosure allows for multiple rows of nut plates.

The nut plate ring assembly 10 includes a first alignment guard 14-1, a second alignment guard 14-2, a third alignment guard 14-3, and a fourth alignment guard 14-4. As explained in more detail below, each alignment guard 14 (also referred to as a snap alignment guard) is configured in a generally semi-circular shape. In this way, the first alignment guard 14-1 and the second alignment guard 14-2 are attached at the inner surface 18B of the nut plate ring 12. Each of the first alignment guard 14-1 and the second alignment guard 14-2 covers about half of the through openings 20 in the first row 22-1, such that the first alignment guard 14-1 and the second alignment guard 14-2 collectively secure a plurality of nut plates (not shown) corresponding to the entire first row 22-1 of the through openings 20. Similarly, the third alignment guard 14-3 and the fourth alignment guard 14-4 are attached at the inner surface 18B of the nut plate ring 12. Each of the third alignment guard 14-3 and the fourth alignment guard 14-4 cover about half of the through openings 20 in the second row 22-2, such that the third alignment guard 14-3 and the fourth alignment guard 14-4 collectively secure a plurality of nut plates (not shown) corresponding to the entire second row 22-2 of the through openings 20.

Using two alignment guards 14 per row 22 of through openings 20 is to compensate for thermal expansion of the alignment guards 14 and to facilitate assembly of the alignment guards 14 to the nut plate ring 12 (e.g., as the alignment guards 14 are required to flex less). However, more or fewer alignment guards 14 may be used per row 22. In particular, instead of two semi-circle alignment guards 14, a single circular alignment guard 14 may be used such that the single circular alignment guard corresponds to all of the through openings 20 in the row 22. Further, it is noted that one alignment guard 14 may be used to cover multiple rows 22. For example, the first alignment guard 14-1 and the third alignment guard 14-3 may be integrally attached to one another (e.g., to form a single double row semi-circular alignment guard 14). Further, the alignment guards 14 may be configured to collectively cover only a portion of the through openings 20 in a row 22.

The nut plate ring 12 further includes a first notch 25A and a second notch 25B defined at the first end 16A to facilitate attachment of nut plates corresponding with the first row 22-1 of through openings 20 (not shown), as described below in more detail. Similarly, a third notch and a fourth notch (not shown) may be defined at the second end 16B to facilitate attachment of nut plates corresponding with the second row 22-2 of through openings 20. Of course, more or fewer notches could be used.

FIG. 1B is a perspective view of a second embodiment of a nut plate ring assembly 10' with one row of through openings 20 and corresponding nut plates (not shown). The nut plate ring assembly 10' is substantially similar to the nut plate ring assembly 10 of FIG. 1A (and includes similar reference numerals), except as otherwise discussed herein. In particular, the nut plate ring assembly 10' includes a nut plate ring 12', a single circular alignment guard 14' and a plurality of nut plates (not shown). However, the nut plate ring 12' includes a single row 22' of through openings 20 circumferentially spaced around the nut plate ring 12'. In this way, the nut plate ring assembly 10 includes a single circular alignment guard 14'. In particular, the alignment guard 14' is attached at the inner surface 18B of the nut plate ring 12'. The alignment guard 14' cover the entirety of the through openings 20 in the row 22', such that the alignment guard 14' secures the entirety of the plurality of nut plates (not shown) corresponding to the entire row 22' of the through openings 20. Of course, as noted above other configurations may be used.

The nut plate ring 12' includes one notch 25' defined at the first end 16A to facilitate attachment of nut plates corresponding to the row 22'. The nut plate ring 12' could include more notches 25' defined at the first end 16A and/or notches 25' defined at the second end 16B.

FIG. 1C is a perspective view of a missile casing assembly 24 including the nut plate ring assembly 10 of FIG. 1A. The missile casing assembly 24 includes a first cylinder 26 (also referred to as a first casing, first missile casing, etc.) defining a first interior 28 and a second cylinder 30 defining a second interior 32. At least a portion of the first cylinder 26 is positioned within at least a portion of the second cylinder 30 (also referred to as a second casing, second missile casing, etc.), thereby creating an overlap. The nut plate ring assembly 10 is positioned within the overlap. In particular, the nut plate ring assembly 10 is positioned within the interior 28 of the first cylinder 26 (and accordingly within the interior 32 of the second cylinder 30). In other words, at least a portion of the first cylinder 26 is positioned between the nut plate ring assembly 10 and the second cylinder 30. As explained in more detail below, fasteners 34 are positioned within the through openings 20 of the nut plate ring assembly 10, and through holes of the first cylinder 26 and the second cylinder 30 attach the nut plate ring assembly 10, first cylinder 26, and second cylinder 30 to each other.

Figure 2A:
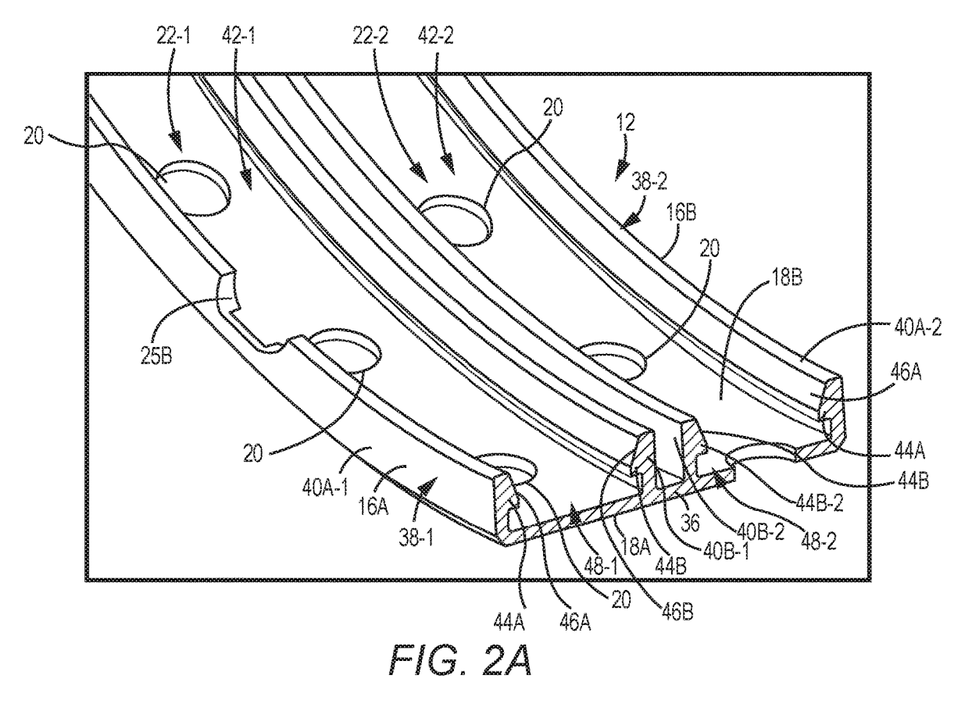
FIG. 2A is a perspective cross-sectional view of a nut plate ring of the nut plate ring assembly of FIG. 1A.

FIGS. 2A-2D are views of the nut plate ring assembly 10 and components thereof. In particular, FIG. 2A is a perspective cross-sectional view of a nut plate ring 12 of the nut plate ring assembly 10 of FIG. 1A. The nut plate ring 12 is made of metal, but could be made of other materials (e.g., plastic). The nut plate ring 12 includes a cylindrical wall 36 defining the outer surface 18A and the inner surface 18B. The first row 22-1 and the second row 22-2 of through openings 20 are defined in and extend through the thickness of the cylindrical wall 36.

The nut plate ring 12 further includes a first pair of rails 38-1 and a second pair of rails 38-2 (generally referred to as pair of rails 38) extending from the inner surface 18B of the cylindrical wall 36 around an inner circumference of the nut plate ring 12. The first pair of rails 38-1 correspond to the first row 22-1 of through openings 20, and the second pair of rails 38-2 correspond to the second row 22-2 of through openings 20.

In particular, the first pair of rails 38-1 includes a first rail 40A-1 (also referred to as an outer rail, peripheral rail, annular rail, etc.) and a second rail 40B-1 (also referred to as an inner rail, center rail, annular rail etc.) defining a first channel 42-1 therebetween. Accordingly, the first channel 42-1 extends circumferentially proximate the inner surface 18B of the nut plate ring 12 proximate the first end 16A. The first rail 40A-1 of the first pair of rails 38-1 is positioned at the first end 16A of the nut plate ring 12 and the second rail 40B-1 of the first pair of rails 38-1 is positioned proximate a center of the nut plate ring 12 (between the first end 16A and the second end 16B of the nut plate ring 12), such that the first row 22-1 of through openings 20 is positioned between the first rail 40A-1 and the second rail 40B-1 of the first pair of rails 38-1 (and aligned with a center of the first channel 42-1). Further, the first rail 40A-1 includes a prong 44A with a tapered surface 46A, and the second rail 40B-1 includes a prong 44B with a tapered surface 46B. The prong 44A and the prong 44B are inwardly extending towards each other and define a width of the first channel 42-1. The prongs 44A, 44B engage the nut plates and the alignment guards 14. The tapered surfaces 46A, 46B facilitate engagement with the alignment guards 14. Further, the cylindrical wall 36, the first rail 40A-1 and prong 44A, and the second rail 40B-1 and prong 44B define a first groove 48-1. In this way, the first groove 48-1 is positioned distal from the first channel 42-1 and is wider than the first channel 42-1. Accordingly, as discussed in more detail below, the first groove 48-1 is configured to receive and engage at least a portion of the alignment guard 14 and/or the nut plate to attach the alignment guard 14 and/or the nut plate to the nut plate ring 12. Further, as shown, the second notch 25B is defined within the first rail 40A-1 of the first pair of rails 38-1 to provide an access point for inserting the nut plates within the first channel 42-1 and/or the first groove 48-1, as discussed in more detail below.

Similarly, the second pair of rails 38-2 includes a first rail 40A-2 (also referred to as an outer rail, peripheral rail, annular rail, etc.) and a second rail 40B-2 (also referred to as a medial rail, inner rail, center rail, annular rail, etc.) defining a second channel 42-2 therebetween. Accordingly, the second channel 42-2 extends circumferentially proximate the inner surface 18B of the nut plate ring 12 proximate the second end 16B. The first rail 40A-2 of the second pair of rails 38-2 is positioned at the second end 16B of the nut plate ring 12 and the second rail 40B-2 of the second pair of rails 38-2 is positioned proximate a center of the nut plate ring 12 (between the first end 16A and the second end 16B of the nut plate ring 12), such that the second row 22-2 of through openings 20 is positioned between the first rail 40A-2 and the second rail 40B-2 of the second pair of rails 38-2 (and aligned with a center of the second channel 42-2). Further, the first rail 40A-2 includes a prong 44A with a tapered surface 46A, and the second rail 40B-2 includes a prong 44B with a tapered surface 46B. The prong 44A and the prong 44B are inwardly extending towards each other and define a width of the second channel 42-2. The prongs 44A, 44B engage the nut plates and the alignment guards 14. The tapered surfaces 46A, 46B facilitate engagement with the alignment guards 14. Further, the cylindrical wall 36, the first rail 40A-2 and prong 44A, and the second rail 40B-2 and prong 44B define a second groove 48-2. In this way, the second groove 48-2 is positioned distal from the second channel 42-2 and is wider than the second channel 42-2. Accordingly, as discussed in more detail below, the second groove 48-2 is configured to receive and engage at least a portion of the alignment guard 14 and/or the nut plate to attach the alignment guard 14 and/or the nut plate to the nut plate ring 12. Further, although not shown, a notch 25 may be defined within the first rail 40A-2 of the second pair of rails 38-2 to provide an access point for inserting the nut plates within the first channel 42-1 and/or the first groove 48-1, as discussed in more detail below.

Figure 2B:
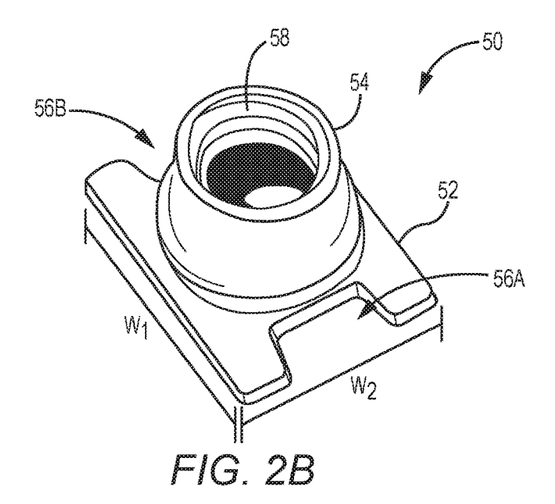
FIG. 2B is a perspective view of a nut plate of the nut plate ring assembly of FIG. 1A.

FIG. 2B is a perspective view of a nut plate 50 of the nut plate ring assembly 10 of FIG. 1A. The nut plate 50 (also referred to as a nutplate, plate nut, flanged nut, rectangular nut plate, rectangular nutplate, rectangular plate nut, rectangular flanged nut, etc.) includes a rectangular portion 52 and a cylindrical portion 54 upwardly extending from the rectangular portion 52. The rectangular portion 52 has a first width W1 and a second width W2. At least one of the first width W1 or second width W2 is configured to be similarly sized as a width of the groove 48. In certain embodiments, the rectangular portion 52 has a width that is greater than the width of the channel 42 but less than the width of the groove 48 to retain the rectangular portion 52 within the groove 48. The rectangular portion may include a first recess 56A and a second recess 56B (opposite the first recess 56A), to reduce weight of the nut plate 50. The cylindrical portion 54 includes internal threads 58 to engage fasteners 34 (shown in FIG. 1C). It is noted that in embodiments where the rectangular portion 52 is smaller than the width of the channel 42, the nut plate 50 does not need to be slid through the notch 25.

Referring to FIGS. 2A-2B, to assemble the nut plate 50 to the nut plate ring 12, the rectangular portion 52 of the nut plate 50 is inserted through a notch 25 into a groove 48 (such that the cylindrical portion 54 is positioned within the channel 42. The nut plate 50 is then circumferentially translated within the channel 42 and groove 48 until the cylindrical portion 54 of the nut plate 50 is aligned with one of the through openings 20 of the nut plate ring 12.

Figure 2C:
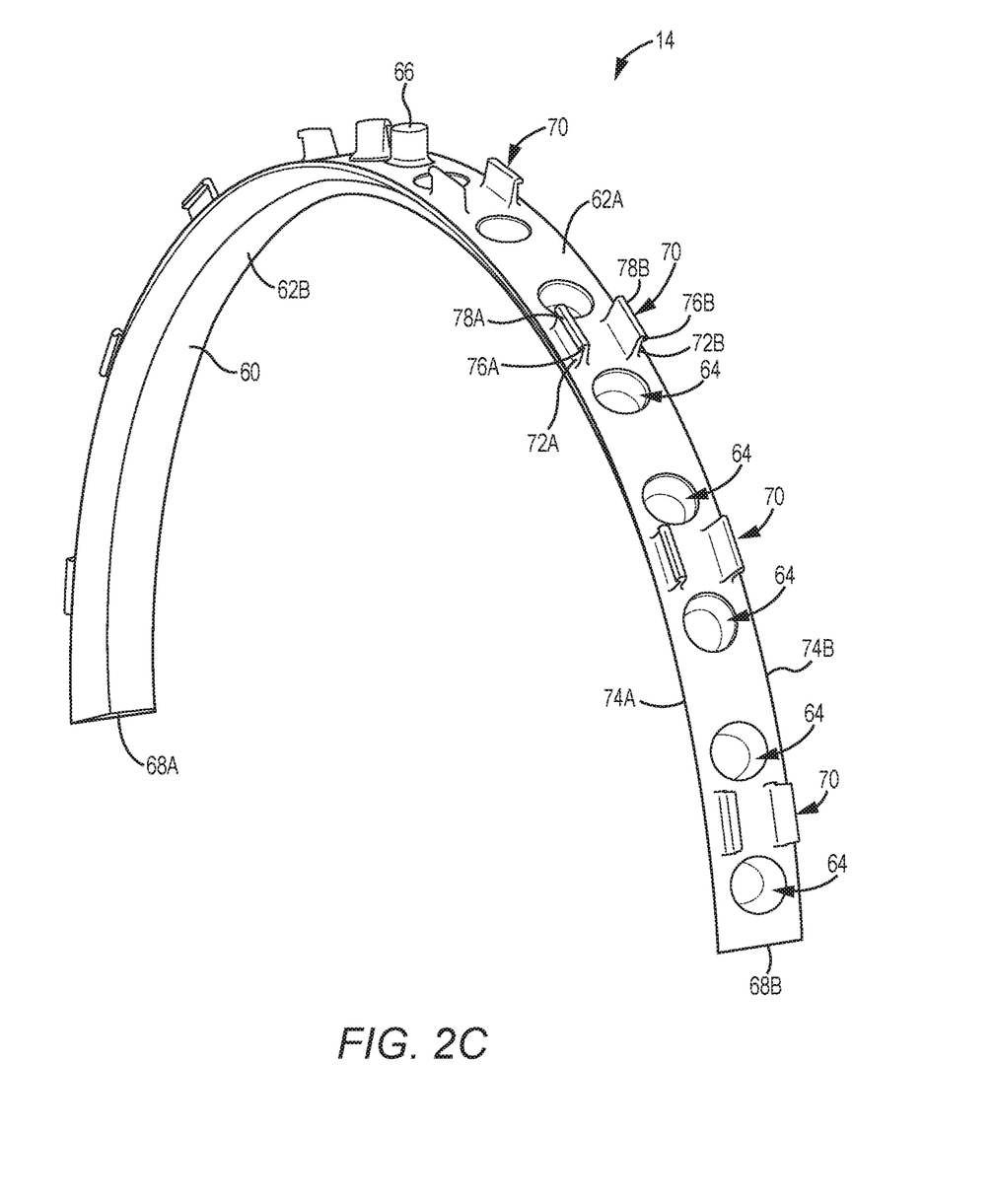
FIG. 2C is a perspective view of an alignment guard of the nut plate ring assembly of FIG. 1A.

FIG. 2C is a perspective view of an alignment guard 14 of the nut plate ring assembly 10 of FIG. 1A. The alignment guard 14 is made of plastic but could be made of other materials (e.g., metal). The alignment guard 14 includes a curved elongated body 60 (also referred to as a strip, body portion, etc.) defining an outer surface 62A and an inner surface 62B. The inner surface 62B of the alignment guard 14 is chamfered (or tapered) to decrease weight and material, as well as to provide a smooth surface to prevent snags or any accidental tearing or other damage of components positioned within the nut plate ring 12. However, the inner surface 62B could also be rounded or any other shape. In particular, because the inner surface 62B of the alignment guard 14 is smooth, the alignment guard 14 protects cables, harnesses, or other components from chaffing on the ends of the fasteners 34.

The outer surface 62A of the curved elongated body 60 defines a plurality of spaced apart apertures 64. The apertures 64 of the alignment guard 14 are configured to align with at least a portion of the through openings 20 with a row 22. Each aperture 64 is configured to receive at least a portion of the cylindrical portion 54 of the nut plate 50 therein to maintain a circumferential position of the nut plate 50 relative to the nut plate ring 12. Further, each aperture 64 is configured to be oversized relative to the size of the cylindrical portion 54 to allow the nut plate 50 to move within a predetermined range relative to the inner surface 18B of the nut plate ring 12, thereby allowing the nut plates 50 to float and absorb tolerance variations. As shown, the apertures 64 are blind holes in order to prevent contamination of an interior of the missile casing assembly 24 during assembly thereof, as discussed in more detail below. However, the apertures 64 may be of any of a variety of shapes and sizes.

The alignment guard 14 further includes an alignment nub 66 upwardly extending from the outer surface 62A of the curved elongated body 60. The alignment nub 66 is shown as a cylindrical protrusion, but other shapes could be used.

The alignment nub 66 provides an insertion point to align the apertures 64 of the alignment guard 14 with the nut plates 50 and/or the through openings 20 of the nut plate ring 12. The alignment nub 66 is positioned in an approximate center of the curved elongated body 60 (at a center between a first end 68A and a second end 68B of the curved elongated body 60). Center positioning of the alignment nub 66 better mitigates potential thermal expansion problems. For example, if alignment nubs were placed at ends 68A, 68B of the curved elongated body 60, thermal expansion may cause buckling of the curved elongated body 60 and potential accidental detachment of the alignment guard 14 from the nut plate ring 12.

The alignment guard 14 further includes couplings 70 upwardly extending from the outer surface 62A of the curved elongated body 60. In certain embodiments, each coupling 70 includes a snap-fit attachment using flexible clips, as discussed in more detail below. The couplings 70 are spaced apart along a length of the curved elongated body 60. Each coupling 70 is positioned between apertures 64 to decrease the width of the alignment guard 14, however, the coupling 70 could be configured to be aligned with an aperture 64 (such that the aperture 64 is positioned in the middle of the coupling 70). Further, a coupling 70 is positioned between every other aperture 64 to decrease the number of couplings 70 used, thereby reducing weight and cost. Depending on the performance requirements, fewer or more couplings 70 could be used, such as positioning a coupling 70 between every aperture 64 or positioning a coupling 70 between every second, third, fourth, fifth, aperture 64, etc.

In certain embodiments, each coupling 70 includes a snap-fit attachment using flexible clips. In particular, in certain embodiments each coupling 70 includes a first arm 72A (also referred to as a first cantilever arm, cantilever lug, etc.) positioned proximate and biased toward a first lengthwise edge 74A of the curved elongated body 60, and a second arm 72B (also referred to as a second cantilever arm, second cantilever lug, etc.) positioned proximate and biased toward a second lengthwise edge 74B of the curved elongated body 60. Accordingly, the first arm 72A and second arm 72B are biased away from each other. The first arm 72A includes a first prong 76A outwardly extending toward the first lengthwise edge 74A. The second arm 72A includes a second prong 76B outwardly extending toward the second lengthwise edge 74B. In this way, the first and second prongs 76A, 76B extend away from each other. As explained in more detail below, the prongs 76A, 76B of the alignment guard 14 cooperate to engage the prongs 44 of the pair of rails 38 of the nut plate ring 12 to attach the alignment guard 14 to the nut plate ring 12. Further, the first prong 76A of the first arm 72A includes a first tapered surface 78A and the second prong 76B of the second arm 72B includes a second tapered surface 78B. The tapered surfaces 78A, 78B of the alignment guard 14 cooperates with the tapered surfaces 46A, 46B of the pair of rails 38 of the nut plate ring 12 to facilitate engagement of the alignment guard 14 with the nut plate ring 12.

Figure 2D:
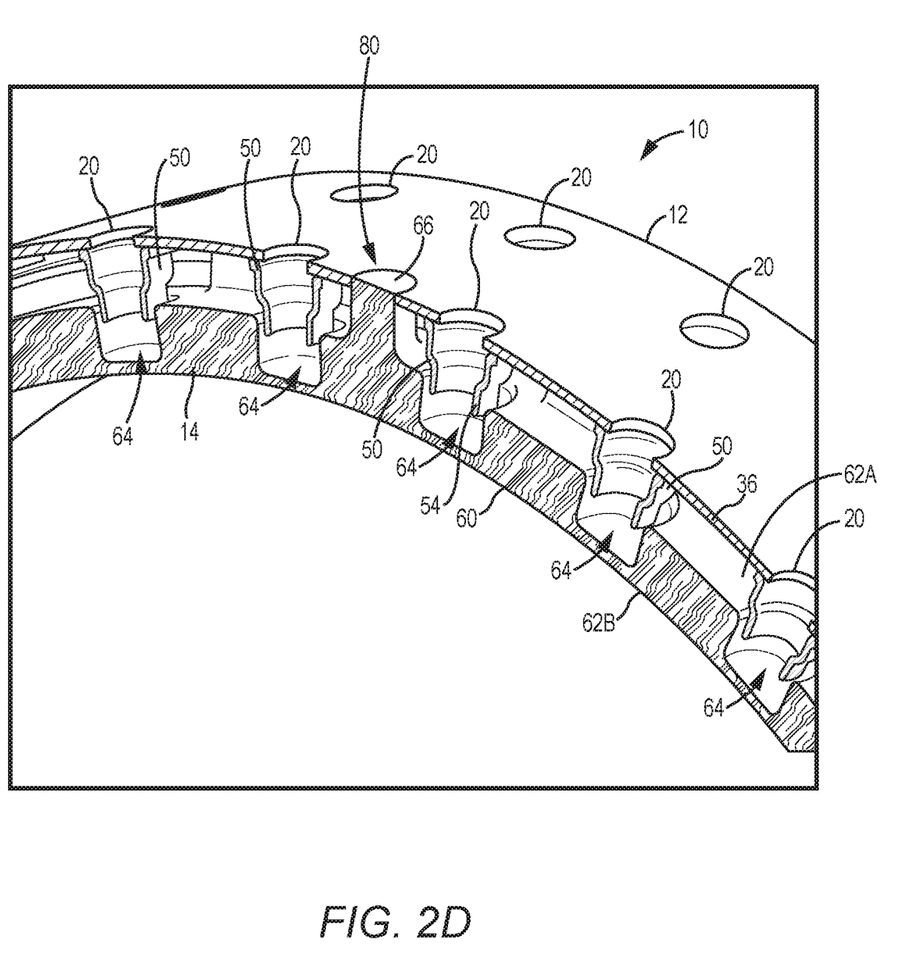
FIG. 2D is a perspective cross-sectional view of the nut plate assembly of FIG. 1A illustrating assembly of the nut plate ring, the nut plate, and the alignment guard.

FIG. 2D is a perspective cross-sectional view of the nut plate assembly 10 of FIG. 1A illustrating assembly of the nut plate ring 12, the nut plate 50, and the alignment guard 14. The nut plate ring 12 further includes an alignment opening 80 (also referred to as an alignment opening, alignment cavity, etc.) positioned between two through openings 20. The alignment opening 80 of the nut plate ring 12 is configured to receive the alignment nub 66 of the alignment guard 14. The alignment opening 80 could be a different size than the through openings 20 to facilitate assembly of the alignment nub 66 within the alignment opening 80. For example, if the alignment opening 80 is larger than the through openings 20, then the alignment nub 66 will only fit within the alignment opening 80.

When assembled, the nut plates 50 are positioned within the channels 42 of the nut plate ring 12, and in particular, the rectangular portion 52 of the nut plates 50 are positioned within the groove 48. Thus, the nut plates 50 are retained at a radial distance relative to a center of the nut plate ring 12 by the rectangular portion 52 of the nut plate 50 being larger than the width of the channel 42. The nut plates 50 are rotationally retained relative to the nut plate ring 12 by the diagonal distance of the rectangular portion 52 being larger than the width of the groove 48. The nut plates 50 are axially retained relative to the nut plate ring 12 by the first and second rails 40A, 40B.

When assembled, the nut plates 50 are positioned within the apertures 64 of the alignment guard 14, and in particular, at least a portion of the cylindrical portion 54 of the nut plate 50 is positioned within the aperture 64 of the alignment guard 14. Thus, the nut plates 50 are circumferentially retained relative to an inner surface 18B of the nut plate ring 12. Further, the outer diameter of the cylindrical portion 54 of the nut plate 50 is less than an interior diameter of the aperture 64 of the alignment guard 14, thereby allowing the nut plate 50 to move within a predetermined range (e.g., up to 0.5 mm, up to 1 mm, up to 5 mm, up to 50 mm, up to 100 mm, etc.) relative to the inner surface 18B of the nut plate ring 12 (allowing the nut plate 50 to float relative to the through opening 20 and the nut plate ring 12). It is noted that the alignment guard 14 also radially retains the nut plates 50 relative to the nut plate ring 12, and that in certain embodiments this is instead of or in addition to the grooves 48 of the nut plate ring 12 radially retaining the nut plates 50. It is also noted that the alignment guard 14 axially retains the nut plates 50 relative to the nut plate ring 12, and that in certain embodiments is instead of or in addition to the first and second rails 40A, 40B axially retaining the nut plates 50.

It is also noted that the alignment guard 14 could use protrusions instead of apertures 64 and that the apertures 64 could be rectangular slots (extending between the first lengthwise edge 74A to the second lengthwise edge 74B of the curved elongated body 60). The alignment guard 14 could use any type of retaining feature as long as the retaining feature (e.g., apertures, protrusions, etc.) retains the nut plates 50 in a circumferential position relative to the inner surface 18B of the nut plate ring 12.

Figure 3A:
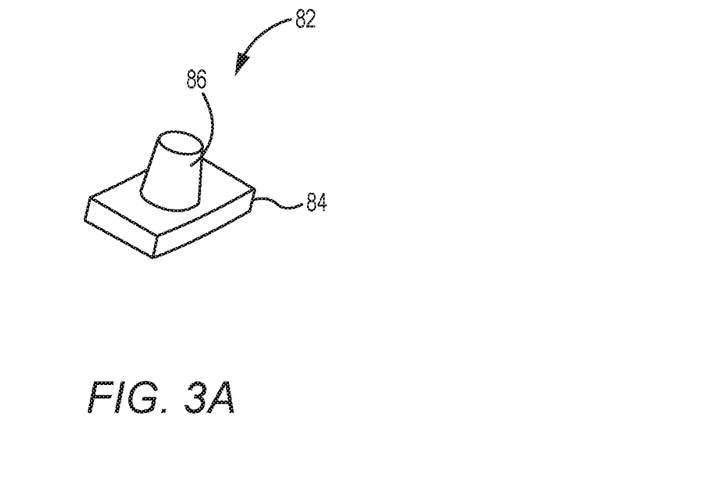
FIG. 3A is a perspective view of a plug for assembling the nut plate ring assembly of FIGS. 1A and 2D.

FIG. 3A is a perspective view of a plug 82 for assembling the nut plate ring assembly 10 of FIGS. 1A and 2D. The plug 82 includes a base 84 and a frustoconical body 86 extending from the base 84. As discussed in more detail below, the frustoconical body 86 temporarily retains the nut plate 50 relative to a through opening 20 of the nut plate ring 12 to facilitate alignment and application of the alignment guard 14 to the nut plate ring 12. In this way, the base 84 provides a gripping surface for application and removal of the plug 82 and in certain embodiments may be omitted. The frustoconical body 86 facilitates insertion of the plug 82 into the through opening 20 of the nut plate ring 12 and into the cylindrical portion 54 of the nut plate 50, as discussed in more detail below. Further, although a frustoconical body 86 is disclosed, other shapes and configurations could be used (e.g., cylindrical).

Figure 3B:
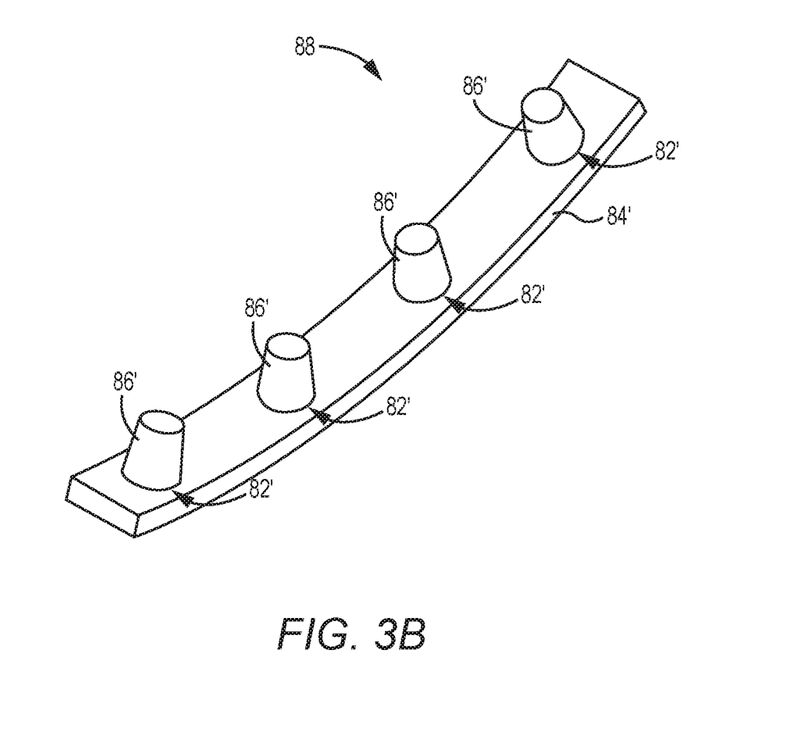
FIG. 3B is a perspective view of a plug strip for assembling the nut plate ring assembly of FIGS. 1A and 2D.

FIG. 3B is a perspective view of a plug strip 88 for assembling the nut plate ring assembly 10 of FIGS. 1A and 2D. The plug strip 88 includes multiple plugs 82' with a base 84' and multiple frustoconical bodies 86', where the bases 84' of the plugs 82' are integrally connected to one another to form a strip. The plugs 82' are substantially similar to the plugs 82 of FIG. 3A (and include similar reference numerals), except as otherwise discussed herein. The plug strip 88 includes a plurality of plugs 82' spaced apart along a length of the plug strip 88. The plugs 82' may be spaced apart similar to the spacing of the through openings 20 in the nut plate ring 12. In this way, multiple plugs 82' of a single plug strip 88 may be inserted into multiple through openings 20 of the nut plate ring 12. Further, multiple plugs 82' of the plug strip 88 may be removed by pulling on one end of the plug strip 88. Accordingly, use of plug strips 88 may be more manageable and more organized than using individual plugs 82 as in FIG. 3A.

FIGS. 4A-4F illustrate assembly of the nut plate ring assembly 10 and assembly of the missile casing assembly 24. As mentioned above with respect to FIGS. 1A and 2A, nut plates 50 are inserted through notches 25 into channels 42, such that the rectangular portion 52 of the nut plates 50 are positioned and retained within the grooves 48. The nut plate 50 is then translated along the channel 42 and groove 48 until the cylindrical portion 54 of the nut plate 50 is about aligned with a through opening of the nut plate ring 12.

Figure 4A:
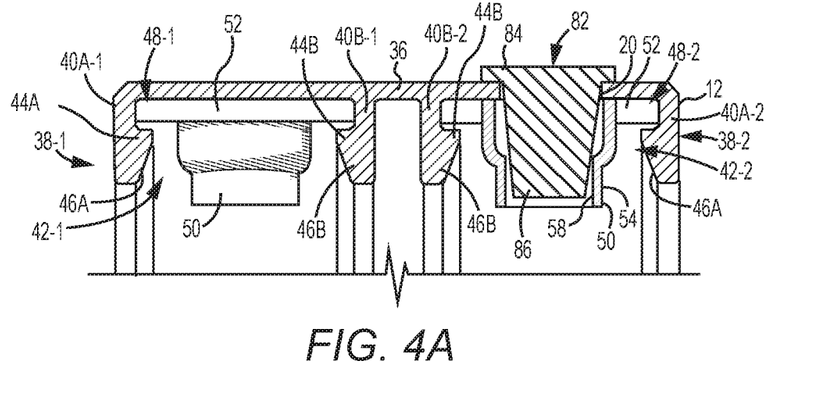
FIG. 4A is a cross-sectional view illustrating assembly of the nut plate ring assembly of FIGS. 1A and 2D using the plug of FIG. 3A.

FIG. 4A is a cross-sectional view illustrating assembly of the nut plate ring assembly 10 of FIGS. 1A and 2D using the plug 82 of FIG. 3A. In particular, once the nut plate 50 is aligned with the through opening 20 of the nut plate ring 12, the frustoconical body 86 of the plug 82 is at least partially inserted into the through opening 20 and into at least a portion of the cylindrical portion 54 of the nut plate 50. In this way, the plug 82 temporarily retains the nut plate 50 in a circumferential position relative to the inner surface 18B of the nut plate ring 12.

Figure 4B:
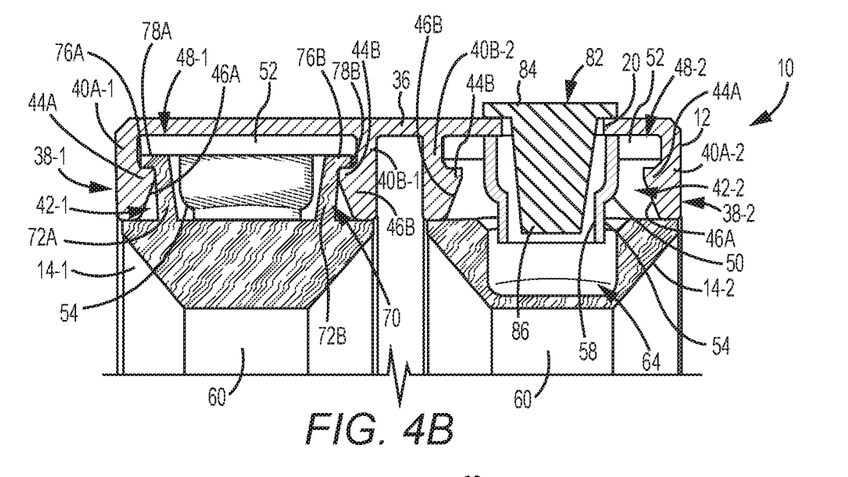
FIG. 4B is a cross-sectional view illustrating assembly of the nut plate ring assembly of FIGS. 1A and 2D by applying the alignment guard.

FIG. 4B is a cross-sectional view illustrating assembly of the nut plate ring assembly 10 of FIGS. 1A and 2D by applying the alignment guard 14. In particular, after a plurality of the nut plates 50 are aligned with a plurality of through openings 20 of the nut plate ring 12 and held in place by a plurality of plugs 82, then the alignment guard 14 may be applied. To apply the alignment guard 14, the alignment nub 66 (shown in FIGS. 2C and 2D) of the alignment guard 14 is inserted into the alignment opening 80 (shown in FIG. 2D) of the nut plate ring 12. With the alignment nub 66 within the alignment opening 80, the apertures 64 of the alignment guard 14 are aligned with the nut plates 50 and the through openings 20 of (at least) one row 22 of the nut plate ring 12. The curved elongated body 60 of the alignment guard 14 is then forced toward the inner surface 18B of the nut plate ring 12. In this way, the tapered surface 46 of the prong 44 of the pair of rails 38 of the nut plate ring 12 engage the tapered surface 78 of the prongs 76 of the couplings 70 of the alignment guard 14. As the curved elongated body 60 continues toward the inner surface 18B of the nut plate ring 12, the tapered surface 46 and tapered surface 78 cooperate to force the prongs 76 of the couplings 70 inward and toward each other. As the curved elongated body 60 continues toward the inner surface 18B of the nut plate ring 12, the prongs 76 of the curved elongated body 60 extend into the groove 48, past the prongs 44 of the pair of rails 38 of the nut plate ring 12, and outward, thereby snapping the alignment guard 14 to the nut plate ring 12. Accordingly, the alignment guard 14 can be attached to the nut plate ring 12 without any adhesive, thereby significantly reducing assembly time.

This process is repeated for each of the plurality of nut plates 50 and alignment guards 14 until all of the through openings 20 of the nut plate ring 12 have a corresponding nut plate 50 aligned with the through opening 20 and held in place by a corresponding alignment guard 14. In other words, the process is repeated until all of the through openings 20 of the nut plate ring 12 are covered by an alignment guard 14. It is noted that assembly of the nut plate ring assembly 10 using the alignment guard 14 does not require any tools.

Figure 4C:
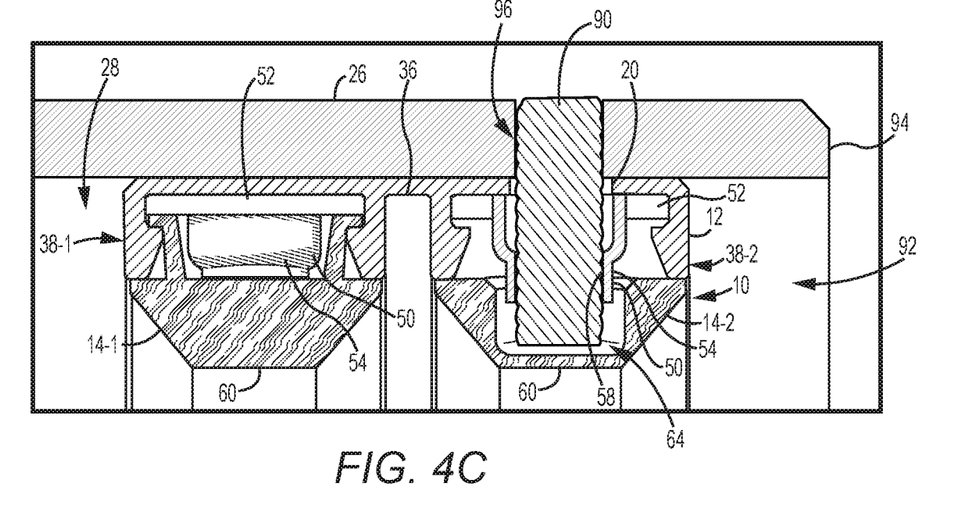
FIG. 4C is a cross-sectional view illustrating assembly of the missile casing assembly of FIG. 1C by using a set screw to temporarily align the nut plate ring assembly with a first cylinder.

FIG. 4C is a cross-sectional view illustrating assembly of the missile casing assembly 24 of FIG. 1C by using a set screw 90 to temporarily align the nut plate ring assembly 10 with a first cylinder 26. In particular, the nut plate ring assembly 10 is inserted through an opening 92 at an end 94 of the first cylinder 26. The first cylinder 26 includes a plurality of through holes 96 positioned proximate the end 94 corresponding in size, shape, and/or positioning with the plurality of through openings 20 of the nut plate ring 12. Accordingly, the plurality of through openings 20 of the nut plate ring 12 are aligned with the plurality of through holes 96 of the first cylinder 26. Once aligned, a set screw 90 is inserted through the through hole 96 of the first cylinder 26, through the through opening 20 of the nut plate ring 12, and into the cylindrical portion 54 of the nut plate 50, thereby threadably engaging the internal threads 58 of the cylindrical portion 54 of the nut plate 50. Of course, more set screws 90 could be used. It is noted that there is no particular orientation required so long as the plurality of through openings 20 of the nut plate ring 12 are aligned with the plurality of through holes 96 of the first cylinder 26.

Figure 4D:
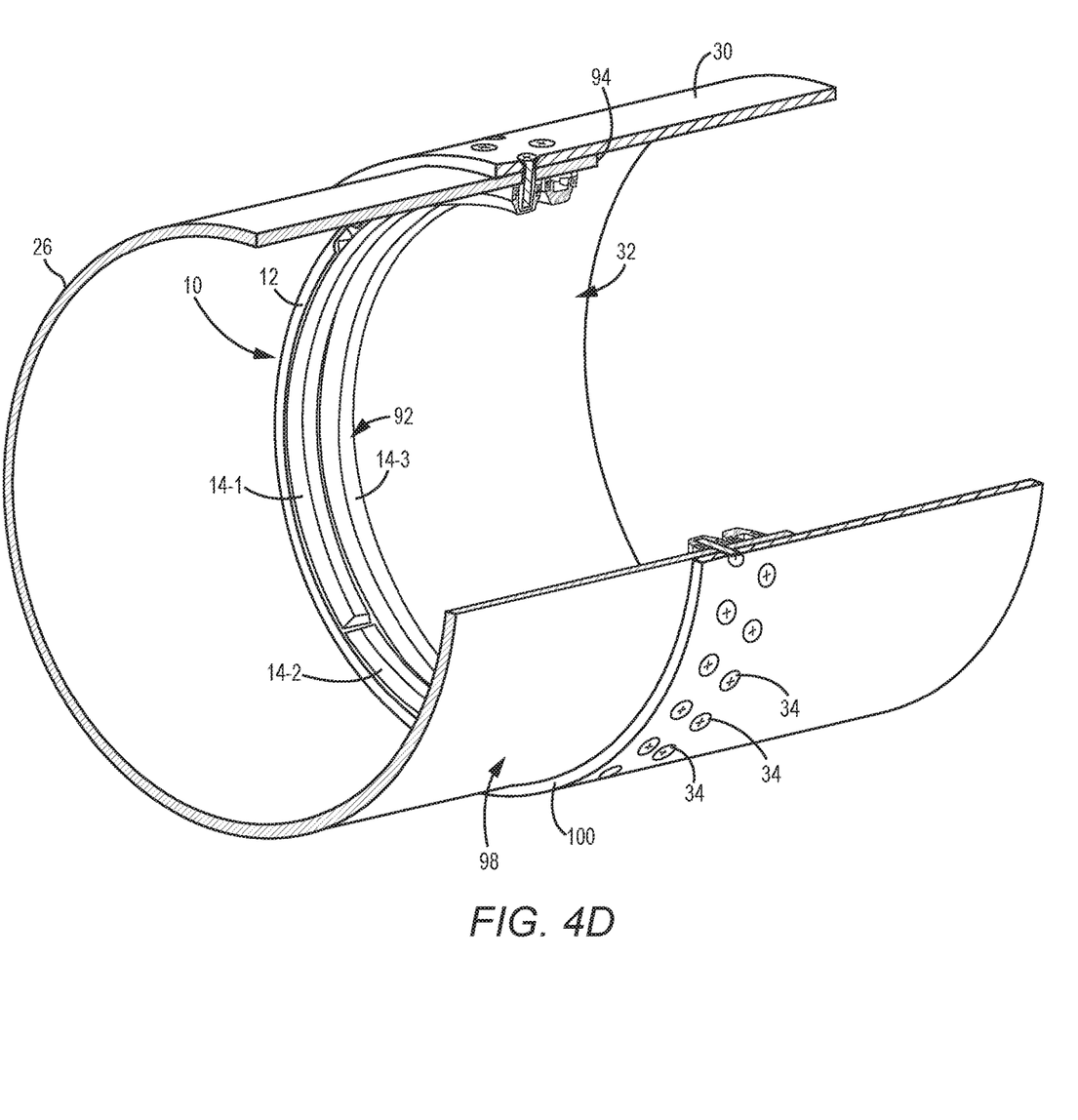
FIG. 4D is a perspective cross-sectional view illustrating assembly of the missile casing assembly of FIG. 1C by using fasteners to attach the nut plate ring assembly, the first cylinder, and a second cylinder to each other.
Figure 4E:
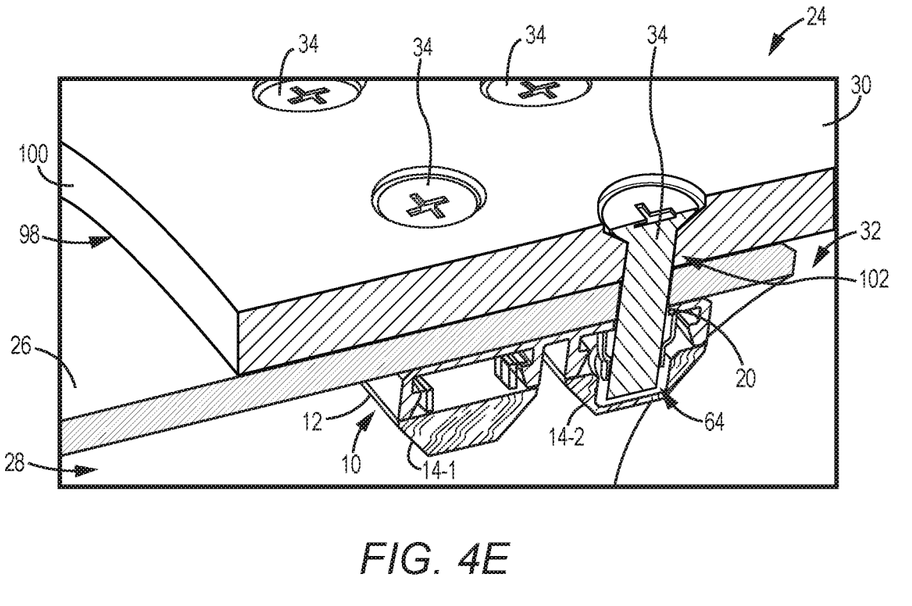
FIG. 4E is a perspective cross-sectional view of a portion of the missile casing assembly of FIG. 4D.
Figure 4F:
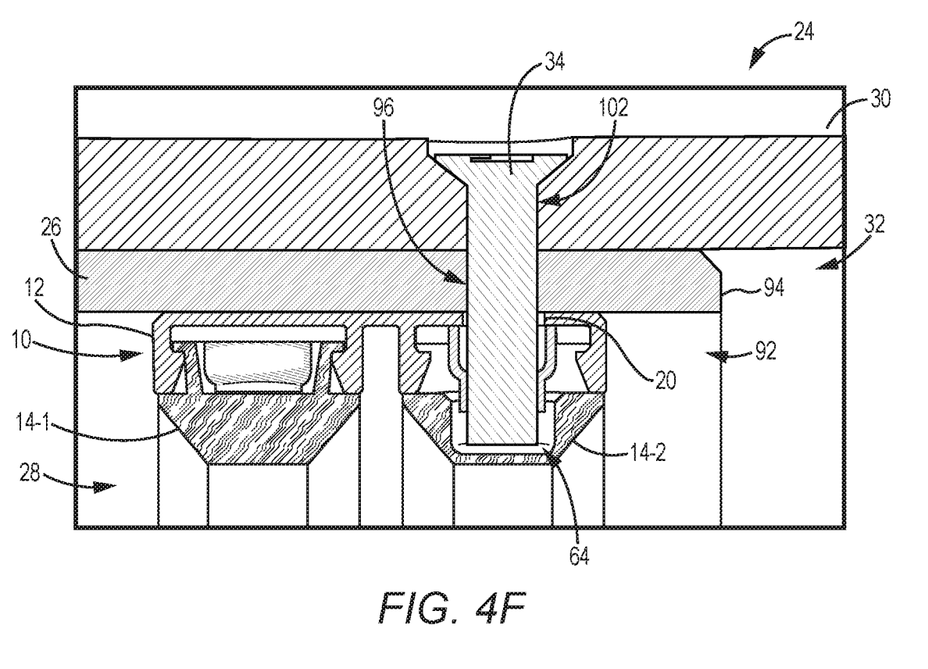
FIG. 4F is a side cross-sectional view of the missile casing assembly of FIG. 4E.

FIGS. 4D-4F are views illustrating assembly of the missile casing assembly 24 of FIG. 1C by using fasteners 34 to attach the nut plate ring assembly 10, the first cylinder 26, and a second cylinder 30 to each other. In particular, FIG. 4D is a perspective cross-sectional view illustrating assembly of the missile casing assembly 24 of FIG. 1C by using fasteners 34 to attach the nut plate ring assembly 10, the first cylinder 26, and a second cylinder 30 to each other. FIG. 4E is a perspective cross-sectional view of a portion of the missile casing assembly of FIG. 4D. FIG. 4F is a side cross-sectional view of the missile casing assembly of FIG. 4E.

The first cylinder 26 and the attached nut plate ring assembly 10 is inserted through an opening 98 at an end 100 of the second cylinder 30. The second cylinder 30 includes a plurality of countersink through holes 102 positioned proximate the end 100 corresponding in size, shape, and/or positioning with the plurality of through openings 20 of the nut plate ring 12 and/or with the plurality of through holes 96 of the first cylinder 26. Accordingly, the plurality of countersink through holes 102 are aligned with the plurality of through openings 20 of the nut plate ring 12 and the plurality of through holes 96 of the first cylinder 26. Of course, the countersink through holes 102 do not need to be countersink. Fasteners 34 are then inserted through the countersink through holes 102 of the second cylinder 30, through the through holes 96 of the first cylinder 96, through the through openings 20 of the nut plate ring 12, and into the cylindrical portion 54 of the nut plate 50, thereby threadably engaging the internal threads 58 of the cylindrical portion 54 of the nut plate 50. Once all of the fasteners 34 have been applied, the set screws 90 are removed and replaced with fasteners 34. When fully assembled, the first cylinder 26 and second cylinder 30 at least partially overlap, with the nut plate ring assembly 10 positioned within the overlap.

As shown, the apertures 64 are blind holes, which prevents debris from entering the interior 28 of the first cylinder 26 and/or the interior 32 of the second cylinder 30 during assembly. Of course, the apertures 64 could be through holes instead.

Once assembled, a nut plate 50 may be replaced (e.g., due to a defect) by removing the alignment guard 14. If necessary, the alignment guard 14 can be forcibly removed such that the couplings 70 are broken. As the alignment guard 14 is made of plastic and the nut plate ring 12 is made of metal, there should not be any damage to the nut plate ring 12. The nut plate 50 may be removed and replaced, and a new alignment guard 14 can be applied (e.g., snapped in).

Those skilled in the art will recognize improvements and modifications to the preferred embodiments of the disclosure. All such improvements and modifications are considered within the scope of the concepts disclosed herein and the claims that follow.

What is claimed is:

1. An alignment guard, comprising:
   a curved elongated body comprising a concave inner surface and a convex outer surface;
   a plurality of couplings integrally extending from the outer surface, each of the plurality of couplings configured to engage an interior of a nut plate ring to attach the alignment guard to the nut plate ring and position the alignment guard inward from the nut plate ring;
   wherein the elongated body forms a plurality of apertures defined in the outer surface, each of the plurality of apertures configured to receive at least a portion of a nut plate to maintain a circumferential position of the nut plate relative to an inner surface of the nut plate ring; and
   wherein each of the plurality of couplings comprises a pair of prongs biased opposite from each other.

2. The alignment guard of claim 1, wherein the curved elongated body forms a semi-circle.

3. The alignment guard of claim 1, wherein each of the plurality of apertures are configured to allow the nut plate to move within a predetermined range relative to the inner surface of the nut plate ring.

4. The alignment guard of claim 1, wherein the plurality of apertures comprises a plurality of blind holes.

5. The alignment guard of claim 1, further comprising an alignment nub integrally extending from the inner surface, the alignment nub configured to engage the nut plate ring to align the plurality of apertures of the alignment guard with a plurality of holes in the nut plate ring.

6. A nut plate ring assembly, comprising:
   a nut plate ring forming a first plurality of through openings circumferentially positioned about the nut plate ring;
   a first plurality of nut plates configured to be positioned proximate an inner surface of the nut plate ring, each of the plurality of nut plates at least partially aligned with one of the plurality of through openings; and
   at least one alignment guard configured to be attached to the nut plate ring to secure at least a portion of the first plurality of nut plates between the nut plate ring and the at least one alignment guard, the at least one alignment guard comprising:
      a curved elongated body comprising a concave inner surface and a convex outer surface opposite the inner surface;
      a plurality of couplings integrally extending from the outer surface, each of the plurality of couplings configured to engage a nut plate ring to attach the at least one alignment guard to the nut plate ring; and
      wherein the elongated body forms a plurality of apertures defined in the outer surface, each of the plurality of apertures configured to receive at least a portion of a nut plate to maintain a circumferential position of the nut plate relative to the inner surface of the nut plate ring.

7. The nut plate ring assembly of claim 6, wherein the nut plate ring further comprises a first pair of rails integrally extending from an inner surface of the nut plate ring, the first pair of rails configured to engage the plurality of couplings of the at least one alignment guard.

8. The nut plate ring assembly of claim 7, wherein each of the plurality of nut plates comprises:
   a rectangular portion positioned between the first pair of rails to rotationally secure the nut plate relative to the nut plate ring; and
   a cylindrical portion at least partially aligned with one of the plurality of through openings.

9. The nut plate ring assembly of claim 7, wherein each the plurality of couplings of the at least one alignment guard comprises a pair of prongs biased opposite from each other, the pair of prongs engaged with the first pair of rails of the nut plate ring.

10. The nut plate ring assembly of claim 6, wherein the at least one alignment guard comprises a first alignment guard and a second alignment guard, the first and second alignment guards securing the first plurality of nut plates to the nut plate ring.

11. The nut plate ring assembly of claim 10, further comprising a second plurality of nut plates, wherein:
   the nut plate ring comprises a second plurality of through openings circumferentially positioned around the nut plate ring, the first plurality of through openings positioned in a first row and the second plurality of through openings positioned in a second row; and
   the second plurality of nut plates are positioned proximate the inner surface of the nut plate ring, each of the second plurality of nut plates at least partially aligned with one of the second plurality of through openings.

12. The nut plate ring assembly of claim 11, wherein the at least one alignment guard comprises a first alignment guard, a second alignment guard, a third alignment guard, and a fourth alignment guard, the first and second alignment guards securing the first plurality of nut plates to the nut plate ring, the third and fourth alignment guards securing the second plurality of nut plates to the nut plate ring.

13. The nut plate ring assembly of claim 6, wherein each of the plurality of apertures are configured to allow the nut plate to move within a predetermined range relative to the inner surface of the nut plate ring.

14. The nut plate ring assembly of claim 6, wherein the plurality of apertures comprises a plurality of blind holes.

15. The nut plate ring assembly of claim 6, wherein:
   the nut plate ring further comprises at least one alignment opening; and
   the at least one alignment guard comprises an alignment nub integrally extending from the inner surface, the alignment nub positioned within the at least one alignment opening to align the plurality of apertures of the at least one alignment guard with the first plurality of through openings in the nut plate ring.

16. A missile casing assembly, comprising:
   a first cylinder comprising a first plurality of through holes circumferentially positioned around the first cylinder;
   a second cylinder comprising a second plurality of through holes circumferentially positioned around the second cylinder, the second cylinder at least partially inserted within an interior of the first cylinder;

a nut plate ring assembly positioned within the second cylinder, the nut plate ring assembly comprising:

a nut plate ring comprising a first plurality of through openings circumferentially positioned around the nut plate ring;

a first plurality of nut plates positioned proximate an inner surface of the nut plate ring, each of the first plurality of nut plates at least partially aligned with one of the first plurality of through openings; and at least one alignment guard attached to the nut plate ring to secure at least a portion of the first plurality of nut plates between the nut plate ring and the at least one alignment guard, the at least one alignment guard comprising:

a curved elongated body comprising an inner surface and an outer surface opposite the inner surface;

a plurality of couplings integrally extending from the outer surface, each of the plurality of couplings configured to engage a nut plate ring to attach the at least one alignment guard to the nut plate ring; and wherein the elongated body forms a plurality of apertures defined in the outer surface, each of the plurality of apertures configured to receive at least a portion of a nut plate to maintain a circumferential position of the nut plate relative to the inner surface of the nut plate ring;

a plurality of fasteners, each of the plurality of fasteners inserted through one of the first plurality of through holes of the first cylinder, the second plurality of through holes of the second cylinder, the first plurality of through openings of the nut plate ring, each of the plurality of fasteners engaging one of the first plurality of nut plates to secure the first cylinder to the second cylinder.

17. The missile casing assembly of claim 16, wherein:

the nut plate ring further comprises a first pair of rails integrally extending from an inner surface of the nut plate ring, the first pair of rails configured to engage the plurality of couplings of the at least one alignment guard;

each of the first plurality of nut plates comprises:

a rectangular portion positioned between the first pair of rails to rotationally secure the nut plate relative to the nut plate ring; and a cylindrical portion at least partially aligned with one of the first plurality of through openings; and each the plurality of couplings of the at least one alignment guard comprises a pair of prongs biased opposite from each other, the pair of prongs engaged with the first pair of rails of the nut plate ring.

18. The missile casing assembly of claim 16, further comprising a second plurality of nut plates, wherein:

the nut plate ring comprises a second plurality of through openings circumferentially positioned around the nut plate ring, the first plurality of through openings positioned in a first row and the second plurality of through openings positioned in a second row; and the second plurality of nut plates are positioned proximate the inner surface of the nut plate ring, each of the second plurality of nut plates at least partially aligned with one of the second plurality of through openings.

19. The missile casing assembly of claim 16, wherein the at least one alignment guard comprises a first alignment guard and a second alignment guard, the first and second alignment guards securing the first plurality of nut plates to the nut plate ring.

20. The missile casing assembly of claim 16, wherein:

the nut plate ring further comprises at least one alignment opening; and the at least one alignment guard comprises an alignment nub integrally extending from the inner surface, the alignment nub positioned within the at least one alignment opening to align the plurality of apertures of the at least one alignment guard with the first plurality of through holes in the nut plate ring.

* * * * *